United States Patent [19]

Anthony

[11] Patent Number: 4,536,153

[45] Date of Patent: Aug. 20, 1985

[54] REFRACTORY SHELF FOR HOME HOBBYIST KILN AND METHOD OF MAKING KILN

[76] Inventor: Frank H. Anthony, 1709 N. Hullen, Metairie, La. 70001

[21] Appl. No.: 468,876

[22] Filed: Feb. 23, 1983

[51] Int. Cl.[3] .......................... F27D 5/00; F27D 1/16; A21B 1/00

[52] U.S. Cl. .................................... 432/258; 219/400; 432/3

[58] Field of Search .................. 432/120, 258, 259, 3; 34/201; 219/400

[56] References Cited

U.S. PATENT DOCUMENTS

| | | | |
|---|---|---|---|
| 585,765 | 7/1897 | Jeffery | 432/258 |
| 1,877,424 | 9/1932 | Fear | 432/259 |
| 2,512,567 | 6/1950 | Milligan | 432/258 |
| 3,752,643 | 8/1973 | Robinson | 432/120 |
| 4,215,265 | 7/1980 | White | 219/400 |
| 4,259,061 | 3/1981 | Dubetsky | 432/258 |

FOREIGN PATENT DOCUMENTS

| | | | |
|---|---|---|---|
| 667787 | 6/1979 | U.S.S.R. | 432/258 |

*Primary Examiner*—John J. Camby

*Attorney, Agent, or Firm*—Cushman, Darby & Cushman

[57] ABSTRACT

Disclosed is an improved hobbyist kiln containing one or more shelves each of which is constructed so as to have a hole located at about its geometric center. Additionally, the outside dimensions of the shelf are such that, on placing the shelf in the kiln, an annular space is provided between the perimeter of the shelf and the refractory wall of the kiln. The shelf hole in conjunction with the annular space provides a patch for thermal convection currents to cycle within the kiln, thereby evening out temperature extremes which would otherwise occur therein. The shelves may be provided in the greenware state with a refractory alumina kilnwash, the resulting composite being fired to yield an improved refractory shelf with a durable tightly-bonded protective surface coating.

12 Claims, 4 Drawing Figures

REFRACTORY SHELF FOR HOME HOBBYIST KILN AND METHOD OF MAKING KILN

FIELD OF THE INVENTION

This invention relates to improved kilns and, in particular, to hobbyist kilns wherein the temperature throughout the whole of the internally heated cavity is substantially more uniformly maintained by controlled convection currents.

BACKGROUND OF THE INVENTION

"Kiln" is a term of art used to designate a type of oven used for firing ceramic wares. A ceramic material, such as any member of that class of materials commonly designated as "clay", is wetted into a plastic mass and pre-shaped prior to being dried and then fired in the kiln into a permanently rigidized or sintered structure. The fired object is usually somewhat smaller than its unfired counterpart, resulting in increased strength and density.

The kiln used for firing should desirably be capable of maintaining a uniform temperature throughout the usable firing cavity into which unfired ceramics are placed. The extent to which uniformity of temperature is achieved is a major factor in ultimately determining how uniform the strength and quality will be across each individual batch of articles fired. In kilns exhibiting heat gradients or random hot and cold regions, batches of articles will be seen to contain individual pieces which have been overfired, underfired, or adequately fired, depending on the specific location of each piece within the kiln.

Non-uniform heating problems are especially prevalent in hobbyist kilns which are generally constructed much more cheaply than their commercial counterparts. FIG. 1 shows in cross section a typical hobbyist kiln, generally designated at 1, and a careful study of its structure has revealed a possible reason for the non-uniform heating exhibited by such devices, which reason will be subsequently discussed. The device comprises a top-loading cabinet having doors generally designated at 2 and a refractory liner 3 which lines the whole of the heating cavity and which is capable of withstanding the temperatures used for firing. That portion of the refractory liner 3 which lines the sides of the kiln is commonly provided with channels 4 on its side into which are placed heating means such as resistive heating coils. Schematically shown is a series of shelf units 5, 6, and 7 which compartmentalize the heating cavity and onto which the ceramic objects to be fired are placed. It is noted that three shelf units have been shown only for purposes of illustration, not limitation. Not shown are the spacing means which support the shelves as a tiered arrangement in fixed but adjustable relation to each other. The spacing means are called "posts" in the art and are ceramic spacers placed at the shelf perimeter. Posts are commonly available in standard sizes varying from ½ inch to 12 inches so that the spacing between shelves can be adjusted as desired.

The temperature of the kiln can be monitored by means of so-called pyrometric cones. A pyrometric cone is a conically shaped structure which is itself constructed of refractory material compositionally designed to bend under its own weight within a fairly narrow temperature range. A cone is said to have reached its "end point" when its tip has bent to the level of its base. Refractory materials having different resistances to bending can be used to fabricate the cones and thereby provide the wherewithal to monitor kiln temperatures over a reasonably wide range of temperatures. Pyrometric cones fabricated of the same materials can be used to determine whether a kiln is heating uniformly, and where cold spots exist if it is not, simply by placing the cones in different regions of the cavity, e.g. on different shelves.

The present invention stems from the observation that the coldest regions in a hobbyist kiln configured as shown in FIG. 1 invariably occur at the top and bottom of the kiln. Accordingly, a series of experiments designed to probe this problem was conducted wherein cones having standard numerical designations 07, 08, and 09 were placed on the floor of a kiln and on each of three shelves situated therein. In some of the experiments the kiln was left unloaded while in others it contained varying amounts of ceramic wares. The equivalent temperature specified by the manufacturer for the cones was 1815°, 1740°, and 1705° F., respectively.

The kiln was gradually heated according to a procedure conventionally recommended under actual conditions of use when firing ceramic wares. Two successively higher power levels were applied for an hour each to initially raise the kiln to an intermediate temperature before applying a third and final power level by which the kiln reached its operating temperature slightly in excess of the equivalent temperature for the highest melting (07) cone, i.e. 1815° F. The kiln was then allowed to cool.

After the kiln was cooled, it was observed that the 07 cone on the top shelf (5 in FIG. 1) had not bent at all, but that the 08 and 09 cones had reached their end point. All cones on the first and second shelves (7 and 6 in FIG. 1, respectively) had reached their end point. On the floor of the kiln, only the 09 cone had reached its end point, the 07 and 08 cones being tipped barely noticeably.

These experiments indicated, as previously mentioned, not only that cold spots existed in the kiln, but also that the temperature differential from one region of the kiln to another was reasonably significant. That all cones on the first and second shelves had completely bent indicated that an equivalent temperature of at least 1815° F. had been reached in the middle portion of the heating cavity. By contrast, a temperature somewhere between 1740° and 1815° F. had been reached at the top of the kiln, while a temperature of only between 1705° and 1740° F. had been reached on the floor. Moreover, the results were reproducible under both load and no-load conditions.

These experimental results led to the surmise that the shelves themselves were blocking the transfer of heat between the top and bottom of the kiln. Further experimentation led to the solution of this thorny problem, which solution constitutes the subject of this invention.

SUMMARY OF THE INVENTION

It was conjectured that the shelves "blocked" heat transfer by preventing natural patterns of heat convection within the kiln. That is, a cool region was hypothesized to lie at the top of the kiln adjacent to the doors 2 shown in FIG. 1. This cool air would normally, however, also be expected to be more dense than the hotter air toward the center of the kiln between shelves 5 and 7, and would therefore be expected to fall toward the bottom of the kiln where hotter, lighter air would be rising to meet it. The result, in the absence of blocking, would be a temperature "neutralizing" effect such that there would exist an ongoing, reproduceable pattern of traveling temperature currents which would thermally equilibrate in traversing the kiln such that an evening out of cold spots would occur and result in a moderation of the temperature extremes which exist when shelving is present.

It has now been discovered that by the simple expedient of cutting an orifice in the shelves, the natural pattern of heat convection will indeed establish itself within the kiln such that temperature differentials are largely eliminated. The orifice should not be haphazardly placed just anywhere, but should preferably be cut in the geometric center of each shelf. It is also preferably of an optimum size (i.e. neither too large nor too small). And, it preferably comprises only one orifice in each shelf rather than a large plurality of orifices.

These and other objects and advantages of the invention will become more apparent and more readily appreciated from the following detailed description of the presently preferred exemplary embodiment of the invention taken in conjunction with the accompanying drawings.

DETAILED DESCRIPTION

Figure 1:
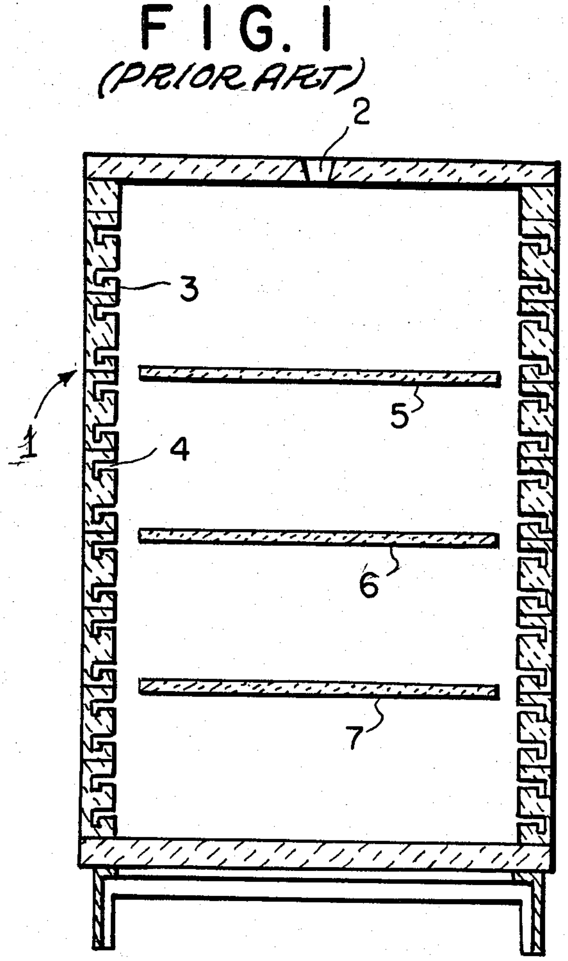
FIG. 1 (PRIOR ART)
FIG. 1 is a cross sectional view of a typical hobbyist kiln and refractory shelving associated therewith according to the prior art.

Several patterns or random hole configurations were experimented with before arriving at the conclusion that a single hole located at the geometric center of each shelf is the most advantageous arrangement. As many as fifteen different prototypes having holes cut in various patterns and in various locations were tried. For example, in one experiment a pattern of holes configured triangularly or in a "pie" shape was employed, while in another a random pattern of holes was placed only on one half of the shelf surface. In an extreme case, as many as two hundred one-half inch diameter holes were cut throughout and over the whole of the surface of each shelf. However, these configurations resulted in stagnant kiln conditions such that no thermal convection was generated. Best results by far were obtained only when a single hole was cut through the geometric center of each shelf. The reason for this is best seen from FIG. 2 which schematically shows the hobbyist kiln 1 having the three shelves 5, 6, and 7 arranged therein, but wherein each shelf has been modified by having a hole cut through its center as shown at 12. It is herein noted that the shelves are designed to fit within the kiln so that an annular space exists between the shelf periphery and the refractory liner 3, as at 13.

As previously mentioned, the coldest air spots exist at the top of the kiln between the top shelf 5 and the loading doors 2, and at the bottom between the lowest shelf 7 and the kiln floor. Air adjacent the doors 2 cools and drops as at 8 through the central hole 12 in shelf 5. As this cold, dense air falls, it creates a vacuum effect which tends to entrain or otherwise create a path for drawing additional cold air after it. Much of the cool air will continue to drop through the central hole in shelves 6 and 7 to the floor of the kiln, forcing the air already there to move to the sides of the kiln where it is heated and rises, traveling to the top of the kiln by passing through the annular spaces as at 13 between the shelf peripheries and the liner 3. The net effect is the formation of a continuous primary thermal recycle loop which cycles air from the top of the kiln through the centered shelf orifices to the kiln floor and then back up to the top of the kiln along the walls and through the spaces between the walls and the shelf peripheries. The force which maintains the continuous downflow of cool air through the centered shelf orifices is, as mentioned, the vacuum effect created by the cool air as it falls, which effect encourages more air to "draft" after it. The downflow of cool air is complemented by the warm air which rises at the walls of the kiln and which creates an updraft, in effect completing and closing the thermal recycle loop.

Some of the cold air may similarly be warmed between shelves and rise without more. Thus, this in effect creates a secondary thermal recycle loop as illustrated by the path 8→9→10→11→8. The combined actions of both primary and secondary loops effects the elimination of temperature extremes from the kiln.

To briefly summarize the pertinent features of a home hobbyist kiln which embodies the teachings of the present invention, said kiln comprises a refractory lined closed cavity having side walls, a top wall, and a bottom wall, wherein there is provided heating means associated with said side walls. Within the heating cavity and disposed generally transversely to the side walls is at least one shelf which divides the cavity and provides a supporting surface for ware to be fired within the kiln. The dimensions of said shelf or shelves are less than the inside dimensions of the cavity such that updrafts of heated currents may pass therebetween, and, most importantly said shelving possesses at least one central aperture so as to permit downdrafts of cooled air to pass therethrough.

The kiln used for the aforementioned experiments was a Blue Diamond (trademark of Blue Diamond Kiln Company, Inc., Metaire, La., 70004) Model 180. This kiln has a top loading door and, viewed from the top, has an interior cavity which is octagonally shaped, each side of the octagon measuring 17⅝ inches. The kiln was 20 inches in depth. The unit is electrically heated, drawing 24 amperes at 240 volts.

This kiln is typical of what home ceramic enthusiasts use in that the heating coils are placed only within the sides of the kiln, but not in the floor or at the top in the doors. It may be that placing heating coils in that portion of the refractory liner which lines the floor and doors would also help to even out the heat through the whole of the cavity. This approach, however, would be more expensive.

Figure 2:
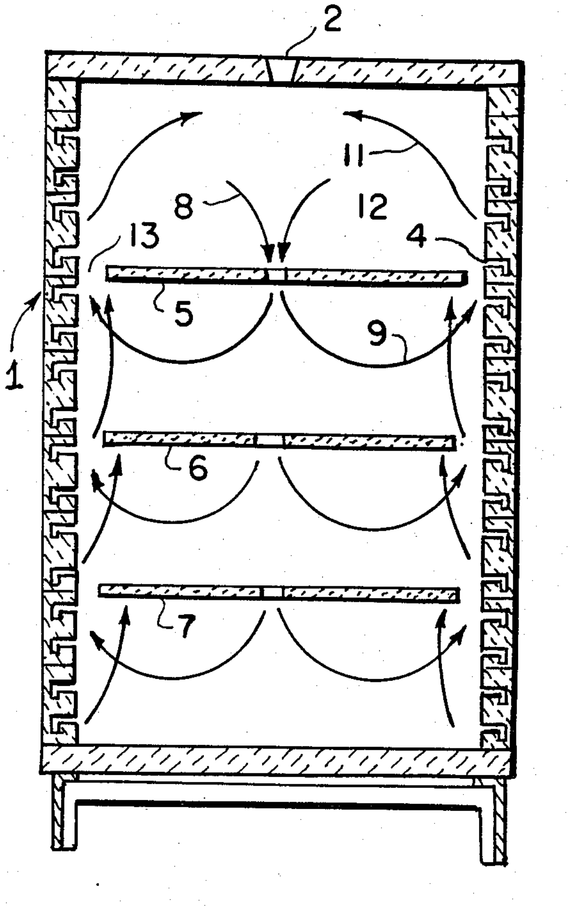
FIG. 2 is a cross sectional view of the hobbyist kiln of FIG. 1, but having associated therewith refractory shelving according to the present invention.
Figure 3:
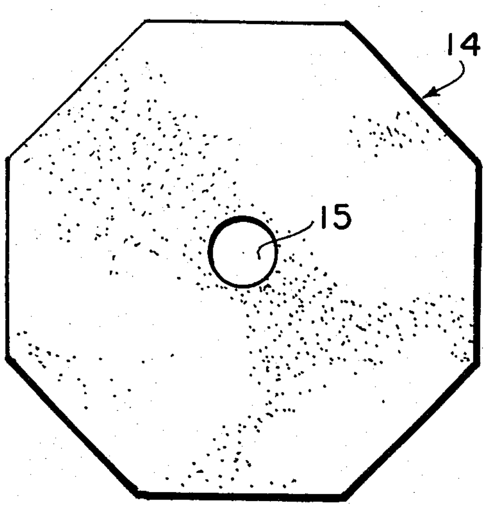
FIG. 3 is a top view of a refractory shelf according to the present invention.
Figure 4:
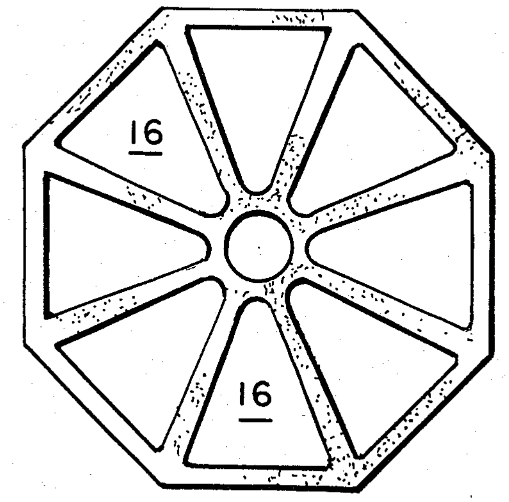
FIG. 4 is a view of the underside of the refractory shelf unit of FIG. 3.

Using the teachings of the present invention, the problem of cold spots is easily and very inexpensively solved. The shelves used in the exemplary embodiment are shown in FIGS. 3 and 4. FIG. 3 shows the top view of a shelf 14 which is octagonally shaped to fit the octagonally shaped kiln cavity. Several shelves may be placed in the cavity and maintained at some desired distance from each other by the use of ceramic spacers. A hole 15 is cut at the geometric center of each shelf. The size of the hole will vary according to the size of the kiln and shelving being used. For the kiln as described above and having the aforementioned dimensions, a hole measuring about 1¾ inches was used, in conjunction with an annular spacing (13, see FIG. 2) between the shelf perimeter and the kiln wall of about 1½ inches achieved by employing an octagonal shelf measuring about 15½ inches on each side. These dimensions for shelf and hole will vary somewhat, as mentioned, depending on the shape and dimensions of the kiln heating cavity, but it is herein emphasized that their routine optimization is well within the capabilities of one of ordinary skill using the above-described guiding principles of the present invention.

The shelves were tested in the identical manner described previously for shelves not having an orifice. Pyrometric cones having numbers 07, 08, and 09 were placed on each of three shelves in the Blue Diamond Model 180 kiln and heated as previously described. Referring to FIG. 2 it was noted after cooling that all three cones on the top shelf 5, the second shelf 6, and the bottom shelf 7 had bent completely to their end points. On the kiln floor the 08 and 09 cones were bent to their end points and the 07 was partially bent.

The results of the experiment using the shelves modified in accordance with the present invention indicate that the cold spot at the top of the kiln was completely eliminated while the cold spot at the bottom was nearly eliminated and at least considerably warmed. Thus, the teachings of the present invention allows smoothing out special temperature fluctuations in home hobbyist kilns in a manner that is effective, inexpensive, easily performed, and easily applied retroactively to existing kiln structures. It is noted that, although the description for making the refractory shelves of this invention has been given for a shelf having an octagonal shape, the invention will also work for other shapes as well, e.g. round, square, etc.

The shelves of this invention may be comprised of any member of the class of refractory clays commonly known in the art and used for such purposes. The material used in the aforementioned experiments, for example, was a magnesium aluminum metasilicate more commonly known as cordierite or iolite. They are conventionally made by casting a water slurry of the ingredients in a mold, dewatering the slurry and then firing the dried shelf. It has heretofore been conventional when making a shelf to fire it and then to apply a so-called kiln wash typically comprising a slurry of kaolin and flint. The shelf is typically sold uncoated and the hobbyist himself applies the wash with a brush. The wash is then fired in the kiln to form a loosely bonded coating which may be stripped off if so desired and which, in any case, must be renewed periodically although it does provide some modicum of protection.

The shelves of this invention may be made in the same manner and supplied with a kiln wash by the hobbyist. However, FIG. 4, which shows the reverse side of the shelf of FIG. 3, shows a preferred embodiment in which the shelf is cast with hollowed out areas 14 effected to reduce the shelf weight. It has further been found that a very durable high refractory wash which is tougher than the more convention kaolin-flint wash comprises aluminap—which has been used heretofore for similar purposes but primarily in large scale commercial applications. The size of the alumina particles is not critical, it being preferred to employ a size which is on the order of 325 mesh. The alumina is sprayed as a water slurry thin enough to pass through the nozzle of a spray gun used to apply the slurry to the shelf in its greenware state and the entire composite is fired. In this manner it is believed the wash chemically bonds or adheres tightly to the shelf such that the optimum arrangement is obtained which possesses the maximum durability. The coating itself is renewable, it being noted that it need be replaced only at much longer intervals, however, than the kaolin-flint wash under identical conditions of use. Thus, this invention makes it possible to produce pre-washed shelves for use in hobbyist kilns, which shelves have a more durable surface than those seen in the prior art.

In addition to the conventional method wherein shelves are fabricated by a process of casting and dewatering, the shelves of this invention may also be produced in an even more advantageous and conventional manner by pressing. The above-described molding and dewatering method yields a shelf wherein the refractory constituent particles are relatively far apart due to the fact that a water slurry (typically 85% water by volume) is used as the starting material, bonding being effected merely by allowing the slurry to "set" during the dewatering process. By contrast, by forming a shelf by pressing the refractory powder itself which contains only (typically) a 6% water content, a shelf of equal strength can be fabricated using less material and, therefore, the shelf is desirably lighter as well. Shelves according to the present invention have been produced using a 500 ton press (Mfr.) in conjunction with pressure steel molds having a Rockwell hardness of 62.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A refractory shelf for use in a home hobbyist kiln which has a refractory lined closed cavity, said shelf comprising a shaped, dried, and fired refractory support having a single hole located substantially at its geometric center, said shelf having outer dimensions less than the interior dimensions of said cavity so as to permit updrafts of heated air currents to pass between said shelf and the wall of said cavity.

2. The shelf of claim 1 which is octagonal in shape.

3. The shelf of claim 1 which is round in shape.

4. The shelf of claim 1 which has had applied to it in the greenware state a kiln wash comprising alumina.

5. The shelf of claim 2 wherein each edge of the octagonal shelf is about 17.5 inches and said hole is about 1.75 inches in diameter.

6. A method of reducing the presence of cold spots in a home hobbyist kiln having at least one shelf unit located therein, comprising situating shelf units having a single hole located at each of their geometric centers into said kiln such that an annular space is created between the periphery of each of said shelf units and the refractory liner comprising the kiln wall, and spacing said shelf units such that the hole in each shelf is substantially coaxial relative to the hole in any other shelf.

7. The method of claim 6 wherein said shelf units are octagonal in shape.

8. The method of claim 6 wherein said shelf units are round in shape.

9. The method of claim 6 wherein said shelf units have had applied thereto in the greenware state a kiln wash comprising alumina.

10. The method of claim 6 wherein said kiln has a heating cavity which is substantially octagonal wherein each edge of the octagon is about 17.5 inches and which is about 20 inches deep.

11. The method of claim 9 wherein each shelf has had applied thereto in the greenware state a kiln wash comprising alumina.

12. A home hobbyist kiln comprising:

a refractory lined closed cavity having side walls, a top wall and a bottom wall;

heating means associated with said side walls;

at least one shelf disposed within said cavity generally transverse to said side walls so as to divide the cavity and provide a supporting surface for ware to be fired within the kiln;

said shelf having at least some outer dimensions less than the inside dimensions of the cavity so as to permit updrafts of heated air currents to pass therebetween; and said shelf having at least one central aperture therein so as to permit downdrafts of cooled air currents to pass therethrough.

* * * * *